United States Patent [19]

Rickelton

[11] Patent Number: 4,619,816
[45] Date of Patent: Oct. 28, 1986

[54] RECOVERY OF COBALT FROM AMMONIACAL SOLUTIONS CONTAINING COBALT AND NICKEL

[75] Inventor: William A. Rickelton, Niagara Falls, Canada

[73] Assignee: American Cyanamid Company, Stamford, Conn.

[21] Appl. No.: 799,230

[22] Filed: Nov. 21, 1985

[51] Int. Cl.$^4$ ............................................. C22B 23/04
[52] U.S. Cl. ................................... 423/139; 423/143; 423/DIG. 14; 75/101 BE; 75/119; 210/684
[58] Field of Search ........................... 75/101 BE, 119; 423/139, DIG. 14, 143; 210/684

[56] References Cited

U.S. PATENT DOCUMENTS

| | | | |
|---|---|---|---|
| 4,196,078 | 4/1980 | Fujimoto et al. | 423/139 |
| 4,348,367 | 9/1982 | Rickelton et al. | 423/139 |
| 4,353,883 | 10/1982 | Rickelton et al. | 423/139 |
| 4,374,780 | 2/1983 | Robertson | 423/139 |

FOREIGN PATENT DOCUMENTS

| | | | |
|---|---|---|---|
| 1177255 | 11/1984 | Canada | 423/139 |
| 0046933 | 10/1982 | European Pat. Off. | 423/139 |
| 2483464 | 12/1981 | France | 423/139 |

Primary Examiner—John Doll
Assistant Examiner—Robert L. Stoll
Attorney, Agent, or Firm—Henry C. Jeanette

[57] ABSTRACT

A process for the extraction of Co (III) from ammoniacal solutions comprising Co (III) and Ni (II). The process comprises:
(a) contacting said ammoniacal solution with
(b) bis (2,4,4-trimethylpentyl)phosphinic acid or an ammonium or alkali metal salt thereof, said ammoniacal solution forming the aqueous phase and said phosphinic acid, or salt thereof, forming the organic phase, and
(c) a phase modifier whereby the Co (III) values are extracted from said aqueous phase to said organic phase.

20 Claims, No Drawings

RECOVERY OF COBALT FROM AMMONIACAL SOLUTIONS CONTAINING COBALT AND NICKEL

FIELD

This invention relates to the extraction of cobalt from ammonical solutions comprising cobalt and nickel.

BACKGROUND

A number of hydrometallurgical processes have been developed to allow the separation and recovery of cobalt, nickel and several other metals from ammoniacal solutions, i.e. solutions of either ammonia/ammonium sulphate or ammonia/ammonium carbonate.

Briefly, the most common process is based upon the dissolution of cobalt and nickel as their ammine complexes, e.g. $Ni(NH_3)_62+$, followed by selective precipitation. See, for example, Forward, F. A., and Mackiw, V. N., "Chemistry of the Ammonia Pressure Process for Leaching Ni, Cu, and Co from Sherritt Gordon Sulphide Concentrates", Trans. AIME, Vol. 203, pp. 457-463, 1955.

In general, precipitation involves several unit processes and results in a relatively impure product. Several solvent extractants have been investigated as an alternative method to precipitation with the object of improving on product purity. Both chelating (oximes) and acid extractants (di-(2-ethylhexyl)phosphoric acid, D2EHPA) have been studied.

However, neither group of reagents has proved ideally suited. It is extremely difficult to strip $Co^{3+}$ from chelating extractants and reagents such as D2EHPA exhibit the same low Co—Ni selectivity in alkaline systems as they do in acid media.

Bis(2,4,4-trimethylpentyl)phosphinic acid (TMPPA) is a commercially available extractant for acid systems. TMPPA is well known to exhibit high Co—Ni selectively for example in acid sulfate and chloride systems. However, an acid system differs from an ammoniacal aqueous system in that the high pH would be expected to promote nickel extraction, and therefore high Co selectivity in an ammoniacal aqueous system would not be expected.

A process for the extraction of cobalt from ammoniacal solutions comprising cobalt and nickel whereby there is a high selectivity for cobalt and which utilizes a commercially available reagent as an extractant would be a most welcome contribution to the art. This invention provides just such a contribution.

SUMMARY OF THE INVENTION

This invention provides a process for the extraction of Co (III) from ammoniacal solutions comprising Co (III) and Ni (II), said process comprising:

(a) contacting said ammoniacal solution with (b) bis (2,4,4-trimethylpentyl)phosphinic acid or an ammonium or alkali metal salt thereof, said ammoniacal solution forming the aqueous phase and said phosphinic acid, or salt thereof, forming the organic phase, and (c) a phase modifier whereby the Co (III) values are extracted from said aqueous phase to said organic phase.

In carrying out the processes of this invention, extraction techniques believed compatible with an extractant comprising an organophosphinic acid include, but are not limited to, liquid-liquid extraction employing either mixer settlers or columns, such as the reciprocating-plate extraction column, pulse columns or columns employing rotating impellers; packed beds of supported extractants wherein the support can be an inert material, such as diatomaceous earth, or a polymer such as cross-linked polystyrene, the latter approach being more explicity described in U.S. Pat. No. 3,960,762 issued to Kroebel et al in 1976; liquid membrane extraction as described by Bock, Valint and Hayworth of Exxon Research and Engineering Company and selective supported membrane extraction as described by Obermayer, Nichols, Allen and Caron of the Moleculon Research Corporation. Preferably, liquid-liquid extraction techniques are utilized.

The ammoniacal solutions bearing the metal values can be aqueous solutions of ammonia (ammonium hydroxide) and ammonium sulfate, or ammonia (ammonium hydroxide) and ammonium carbonate.

Preferably, the ammoniacal solutions to be extracted are first treated with an oxidizing agent to oxidize any Co (II) present to Co (III). The oxidizing agents suitable for use include but are not limited to: air, oxygen, hydrogen peroxide, and the like.

The Co (III) in the ammoniacal solution is extracted by contacting the solution with an extractant comprising bis (2,4,4-trimethylpentyl)phosphinic acid, or an organic-soluble ammonium or alkali metal salt thereof. The ammoniacal solution forms the aqueous phase and the extractant forms the organic phase.

A phase modifier is utilized to maintain the two phases thus preventing the formation of any third phase. Phase modifiers suitable for use are generally polar, water immiscible organic compounds. Representative examples include, but are not limited to: isodecanol, tributylphosphate (TBP), tributylphosphine oxide, trioctylphosphine oxide, nonylphenol, and the like. Preferably isodecanol is used. The phase modifier is used in an amount of about 0.1 parts to about 10 parts by volume for each 10 parts of extractant with about 0.5 parts to about 6 parts being preferred and about 1 part to about 5 parts by volume being most preferred. The phase modifier is mixed with the extractant before contacting the ammoniacal solution with the extractant.

The extractant, as stated previously, is bis(2,4,4-trimethylpentyl)phosphinic acid or an organic-soluble ammonium or alkali metal salt thereof. Ammonium includes substituted ammonium such as morpholino, piperidino, tetrabutylammonium, and the like; and alkali includes Na, K, and the like. The free phosphinic acid is preferred. However, if desired the aforementioned salts can be used with the ammonium, sodium or potassium salt being preferred and the sodium salt being most preferred.

Conveniently, the pure extractant can be used, in similar fashion to that described below for an extraction solvent, by contacting the extractant with the ammoniacal solution. When the extraction is complete the extractant phase is separated from the aqueous phase. The extracted metals are thereafter separated from the extractant by known techniques.

However, it is generally preferred to employ an extraction solvent, rather than using the extractant neat, comprising from 1 to 95 parts by volume of extractant with from about 99 to 5 parts by volume of a water-immiscible organic diluent, preferably from about 5 to 50 parts by volume of the extractant with from about 95 to 50 parts by volume of diluent.

Generally, a wide variety of water-immiscible organic liquids may be used as the diluent. Suitable diluents include, but are not limited to, carbon tetrachloride, toluene, xylene, kerosene, naphtha, tridecanol, methylisobutylketone, tributylphosphate, cyclohexane, decane, pyridine, dibromoethane, and the like. Preferably, the diluent is an aliphatic or aromatic petroleum distillate. More preferably an aliphatic petroleum distillate (aliphatic hydrocarbon) is utilized.

In the process of this invention the ammoniacal solution is contacted either batchwise, continuously co-current, continuously counter-current or continuously cross-current with the extraction solvent. In general, the ammoniacal solution has from about 0.1 to about 30 grams per liter (gpl) of Co and about 0.5 to about 100 gpl of Ni. The actual concentration of the Co and Ni is not critical and the amount of the extractant needed to extract the Co (III) may be suitably chosen by those skilled in the art without undue experimentation.

The ammonical solution generally has a pH of about 8.5 to about 12.5 with about 9 to about 12 being preferred and about 11 to about 11.8 being most preferred.

The ratio of the volume of the aqueous phase to the organic phase can suitably be chosen by those skilled in the art without undue experimentation to obtain the optimum effective ratio for extraction of the Co. Aqueous to organic ratios of from about 1:20 to about 20:1 are believed to be effective, although other ratios may prove to be effective, depending upon the specific separation.

Phase contact is, for example, commonly achieved in devices called "mixer-settlers", although many other types of devices are available and suitable. In the mixer, one phase is dispersed within the other by stirring or some other appropriate form of agitation. The extraction solvent then forms a complex with the Co (III) to be extracted which complex reports to the organic phase of the two-phase liquid mixture. The dispersion then flows to the settler where phase disengagement occurs under quiescent conditions. Generally, extraction is carried out between 0°–80° C., preferably 20°–50° C.

The separated organic phase can then be scrubbed to remove any occluded nickel. This may be accomplished by means well known to those skilled in the art. For example, the organic phase may be scrubbed with an aqueous ammoniacal cobalt (III) solution containing from about 5 to about 100 gpl cobalt as the ammine-sulfate complex and having a pH within the range of about 8.5 to about 12.5 with about 9 to about 12 being preferred and about 11 to about 11.8 being most preferred.

After the scrubbing the cobalt-bearing organic phase is transferred from the scrubbing to a stripping-circuit which can be any suitable liquid-liquid contactor. Stripping is accomplished by contacting the cobalt containing organic phase with common mineral acids such as sulfuric acid, nitric acid, hydrochloric acid, hydrobromic acid, and the like.

It is to be understood that although much of the preceding disclosure relates to liquid-liquid extraction, the principles and properties are believed to extend to those other extraction techniques previously set forth.

The following examples are provided for the purposes of illustration only. The examples should not be construed as limiting the invention in any way as variations of the invention are possible which do not depart from the spirit and scope of the appended claims.

EXAMPLE 1

In this example, the separation factor (SF) for three extractants was compared. The SF is defined as:

$$\frac{\text{Organic [Co (III)]}}{\text{Aqueous [Co (III)]}} \times \frac{\text{Aqueous [Ni (II)]}}{\text{Organic [Ni (II)]}} = SF$$

wherein the bracketed subject matter represents the equilibrium concentration of the metal value in the brackets.

No phase modifier was utilized and therefore a third phase formation occurred with the three extractants used. However, the SF for TMPPA (utilized in the processes of this invention) was higher than for the other extractants.

In this Example the following extractants were utilized as a solution of 0.54M in Kermac 470-B (an aliphatic petroleum distillate):
1. di(2-ethylhexyl)phosphoric acid (D2EHPA)
2. 2-ethylhexyl ester of 2-ethylhexylphosphonic acid (PC88A)
3. Bis(2,4,4-trimethylpentyl)phosphinic acid (TMPPA)

The aqueous ammoniacal solution was prepared from ammonium sulfate and the sulfates of Co and Ni. The solution contained 1 gpl Ni (II), 1 gpl Co (II) and a total $SO_4^=$ concentration, including $(NH_4)_2SO_4$, of 16 gpl. The pH was adjusted to 11.4 with concentrated $NH_4OH$. Co (II) in the aqueous solution was oxidized to Co (III) with hydrogen peroxide.

The extractant and aqueous ammoniacal solutions were contacted for 5 minutes at 50° C. in a temperature controlled water bath at an organic to aqueous volume phase ratio (O/A) of 1 contact was achieved with the aid of a Burrell Wrist-Action Shaker.

The results are reported in Table I.

TABLE I

| COMPARISON OF SF FOR VARIOUS EXTRACTANTS | | | |
|---|---|---|---|
| | % METAL EXTRACTED | | |
| EXTRACTANT | Co(III) | Ni(II) | SF |
| TMPPA | 90.3 | 23.4 | 31 |
| PC88A | 89.5 | 38.6 | 14 |
| D2EHPA | 88.0 | 60.1 | 5 |

EXAMPLE 2

In this Example the effects of two phase modifiers on the SF were compared. Each phase modifier prevented the formation of a third phase.

The extractant utilized was 0.54M TMPPA in Kermac 470B. The extractant solution had added thereto either:
1. 5 v/o isodecanol; or
2. 5 v/o tributyl phosphate (TBP).

The aqueous ammoniacal solution was prepared and contacted with the organic phase as described in Example 1.

The results are reported in Table II.

TABLE II

| EFFECT OF PHASE MODIFIER ON SF | | | |
|---|---|---|---|
| | % METAL EXTRACTED | | |
| PHASE MODIFIER | Co | Ni | SF |
| Isodecanol | 92.2 | 27.5 | 31 |

TABLE II-continued

EFFECT OF PHASE MODIFIER ON SF

| | % METAL EXTRACTED | | |
| --- | --- | --- | --- |
| PHASE MODIFIER | Co | Ni | SF |
| TBP | 90.7 | 26.3 | 27 |

EXAMPLE 3

This Example compares the SF of TMPPA, PC88A and D2EHPA. Each extractant solution contained a phase modifier.

Each extractant used was 0.54M in Kermac 470B modified with 5 v/o isodecanol.

The aqueous ammoniacal solution was prepared and contacted with the extraction solution as described in Example 1. The exceptions being that the aqueous solution contained 0.97 gpl Co (III) and 0.85 gpl Ni (II) at a pH of 11.6

The results are reported in Table III

TABLE III

COMPARISON OF SF FOR PHASE MODIFIED EXTRACTANTS

| | % METAL EXTRACTED | | |
| --- | --- | --- | --- |
| EXTRACTANT | Co | Ni | SF |
| TMPPA | 91.5 | 15.6 | 58 |
| PC88A | 91.4 | 22.0 | 18 |
| D2EHPA | 90.4 | 46.9 | 7 |

EXAMPLE 4

This Example compares the effect of scrubbing on the phase modified extractants.

Isodecanol modified TMPPA, PC88A and D2EHPA extractants were loaded by contact with an ammoniacal Co (III)/Ni (II) solution in accordance with the procedure of Example 3.

Aliquots of the loaded extractants were contacted at several O/A ratios (volume organic phase to volume aqueous phase) with an aqueous solution containing 44 gpl Co (III) as the ammine-sulfate complex. The pH of this scrub feed solution was adjusted to 11.6 with concentrated $NH_4OH$. The phases were contacted for 5 minutes at 50° C.

The results are reported in Table IV.

TABLE IV

COMPARISON BETWEEN VARIOUS EXTRACTANTS IN SCRUBBING

| | | EQUILIBRIUM ORGANIC CONCENTRATION (gpl) | | Co/Ni IN SCRUBBED |
| --- | --- | --- | --- | --- |
| EXTRACTANT | O/A | Co | Ni | SOLVENT |
| TMPPA | 4 | 7.61 | 0.042 | 180 |
| TMPAA | 1 | 10.9 | 0.0033 | 3300 |
| TMPPA | 0.25 | 12.8 | 0.003 | 4270 |
| PC88A | 4 | 7.51 | 0.100 | 75 |
| PC88A | 1 | 11.6 | 0.016 | 725 |
| PC88A | 0.25 | 18.3 | 0.007 | 2610 |
| D2EHPA | 4 | 7.96 | 0.217 | 37 |
| D2EHPA | 1 | 13.0 | 0.042 | 310 |
| D2EHPA | 0.25 | 14.5 | 0.011 | 1320 |

These results demonstrate that TMPPA is more easily scrubbed.

EXAMPLE 5

This Example compares the effect of stripping on phase modified extractants. Aliquots of the solvents which were scrubbed at O/A=4 as described in Example 4 were taken and contacted at various O/A ratios with aliquots of a 200 gpl $H_2SO_4$ strip feed solution. The phases were contacted for 5 minutes at 50° C.

The results are reported in Table V.

TABLE V

COMPARISON OF VARIOUS EXTRACTANTS IN STRIPPING

| EXTRACTANT | O/A | EXTRACTANT LOADING Co (gpl) | EQUILIBRIUM ORGANIC Co CONCENTRATION (gpl) |
| --- | --- | --- | --- |
| TMPPA | 0.5 | 7.61 | Trace |
| TMPPA | 1 | 7.61 | Trace |
| TMPPA | 10 | 7.61 | 0.86 |
| PC88A | 0.5 | 7.51 | 0.031 |
| PC88A | 1 | 7.51 | 0.031 |
| PC88A | 10 | 7.51 | 0.98 |
| D2EHPA | 0.5 | 7.96 | 0.014 |
| D2EHPA | 1 | 7.96 | 0.090 |
| D2EHPA | 10 | 7.96 | 0.95 |

This Example shows that Co (III) is readily stripped by sulphuric acid.

What is claimed is:

1. A process for the extraction of Co (III) from ammoniacal solutions comprising Co (III) and Ni (II), said process comprising:
   (a) contacting said ammoniacal solution with
   (b) bis (2,4,4-trimethylpentyl)phosphinic acid or an ammonium or alkali metal salt thereof,
   said ammoniacal solution forming the aqueous phase and said phosphinic acid, or salt thereof, forming the organic phase, and
   (c) a phase modifier
   whereby the Co (III) values are extracted from said aqueous phase to said organic phase.

2. The process of claim 1 having the additional step of treating said solution of (a) with an oxidizing agent, before contacting said solution of (a) with said phosphinic acid or salt thereof, whereby Co (II) present in solution is oxidized to Co (III).

3. The process of claim 2 wherein said oxidizing agent is selected from the group consisting of air, oxygen, and hydrogen peroxide.

4. The process of claim 1 wherein said phosphinic acid is mixed with, or said salt is dissolved in, an inert organic water immiscible diluent.

5. The process of claim 4 wherein said diluent is an aliphatic or aromatic petroleum distillate.

6. The process of claim 5 wherein said diluent is an aliphatic petroleum distillate.

7. The process of claim 1 wherein said phase modifier is isodecanol, tributylphosphate, nonylphenol, trioctylphosphine oxide or tridecanol.

8. The process of claim 7 wherein said phase modifier is isodecanol or tributylphosphate.

9. The process of claim 8 wherein said phase modifier is isodecanol.

10. The process of claim 1 wherein said ammoniacal solution has a pH within the range of about 9 to about 12.

11. The process of claim 10 wherein said pH is within the range of about 11 to about 11.8.

12. The process of claim 1 wherein about 0.5 parts to about 10 parts phase modifier is used per 6 parts of extractant by volume.

13. The process of claim 1 conducted at a temperature within the range of about 20° C. to about 50° C.

14. The process of claim 1 having the additional steps of scrubbing the co-extractant nickel from the organic layer with an aqueous ammoniacal cobalt (III) solution and recovering cobalt from the scrubbed organic layer by stripping with a mineral acid.

15. A process for the extraction of Co (III) from ammoniacal solutions comprising Co (III) and Ni (II), said process comprising:
 (a) treating said ammoniacal solution with an oxidizing agent, selected from the group consisting of air, oxygen and hydrogen peroxide, whereby Co (II) present in the solution is oxidized to Co (III), and then
 (b) contacting said ammoniacal solution, having a pH of about 8.5 to about 12.5 and having a Co (III) concentration of about 0.1 gpl to about 30 gpl and a Ni (II) concentration of about 0.5 gpl to about 100 gpl, with
 (c) bis (2,4,4-trimethylpentyl)phosphinic acid or an ammonium or alkali metal salt thereof, mixed with or dissolved in an inert water immiscible organic diluent to form an extracting solvent whereby the concentration of phosphinic acid or salt in said inert diluent is about 1 part to about 95 parts by volume,
 said ammoniacal solution forming the aqueous phase and said phosphinic acid or salt solution forming the organic phase, and
 (d) a phase modifier selected from the group consisting of trioctylphosphine oxide, nonylphenol, tributylphosphate, and isodecanol, used in an amount of about 0.1 parts to about 10 parts per 10 parts by volume of the extractant.

16. The process of claim 15 wherein said inert diluent is an aliphatic or aromatic petroleum distillate.

17. The process of claim 16 wherein the oxidizing agent is air, wherein said inert diluent is an aliphatic petroleum distillate and wherein said phase modifier is isodecanol.

18. The process of claim 17 conducted at a temperature of about 20° C. to about 50° C.

19. The process of claim 15 wherein said pH is within the range of about 9 to about 12; wherein said phase modifier is used in an amount of about 0.5 parts to about 10 parts per about 6 parts of extractant, by volume; and wherein said temperature is within the range of about 20° C. to about 50° C.; and said diluent is an aliphatic or aromatic petroleum distillate.

20. The process of claim 19 wherein said phase modifier is isodecanol.

* * * * *